United States Patent
Rusch et al.

(10) Patent No.: US 12,228,143 B2
(45) Date of Patent: Feb. 18, 2025

(54) STABILIZER OF A COMPRESSOR

(71) Applicant: ACCELLERON SWITZERLAND LTD., Baden (CH)

(72) Inventors: Daniel Rusch, Wettingen (CH); Gerd Mundinger, Wettingen (CH)

(73) Assignee: ACCELLERON SWITZERLAND LTD., Baden (CH)

( * ) Notice: Subject to any disclaimer, the term of this patent is extended or adjusted under 35 U.S.C. 154(b) by 0 days.

(21) Appl. No.: 17/927,470

(22) PCT Filed: May 18, 2021

(86) PCT No.: PCT/EP2021/063073
§ 371 (c)(1),
(2) Date: Nov. 23, 2022

(87) PCT Pub. No.: WO2021/239504
PCT Pub. Date: Dec. 2, 2021

(65) Prior Publication Data
US 2023/0175522 A1 Jun. 8, 2023

(30) Foreign Application Priority Data
May 25, 2020 (EP) .................................. 20176373

(51) Int. Cl.
*F04D 29/42* (2006.01)
*F04D 27/02* (2006.01)
*F04D 29/68* (2006.01)

(52) U.S. Cl.
CPC ......... *F04D 29/4206* (2013.01); *F04D 27/02* (2013.01); *F04D 27/0207* (2013.01);
(Continued)

(58) Field of Classification Search
CPC .. F04D 29/4206; F04D 27/02; F04D 27/0207; F04D 27/023; F04D 27/0238;
(Continued)

(56) References Cited

U.S. PATENT DOCUMENTS

2003/0131596 A1* 7/2003 Sumser ............... F04D 27/0238
60/611
2007/0266705 A1* 11/2007 Wood .................. F04D 29/4213
60/599
(Continued)

FOREIGN PATENT DOCUMENTS

CN 105909562 A * 8/2016
DE 19823274 C1 * 10/1999 ........... F01D 17/105
(Continued)

OTHER PUBLICATIONS

Mueller et al (DE102008026744)—D1—Machine Translation (Year: 2009).*
(Continued)

*Primary Examiner* — Brian Christopher Delrue
(74) *Attorney, Agent, or Firm* — Meunier Carlin & Curfman LLC (57) ABSTRACT

The invention relates to a stabilizer of a compressor, in particular of a radial compressor or diagonal compressor. The stabilizer comprises a first annular stabilizer chamber which encloses a main flow channel in the intake region of a compressor wheel. The stabilizer further comprises a second annular stabilizer chamber which encloses the first annular stabilizer chamber. The invention further relates to a compressor, in particular a radial compressor or diagonal compressor, comprising the stabilizer according to the invention, and to a turbomachine, in particular a turbocharger, comprising the compressor.

15 Claims, 7 Drawing Sheets

(52) U.S. Cl.
CPC ....... *F04D 27/023* (2013.01); *F04D 27/0238* (2013.01); *F04D 29/681* (2013.01); F05D 2220/40 (2013.01); F05D 2240/12 (2013.01); F05D 2260/96 (2013.01)

(58) Field of Classification Search
CPC ............... F04D 29/681; F05D 2220/40; F05D 2240/12; F05D 2260/96
See application file for complete search history.

(56) References Cited

U.S. PATENT DOCUMENTS

| | | | | |
|---|---|---|---|---|
| 2013/0266436 | A1* | 10/2013 | Ibaraki | F04D 29/685 415/208.1 |
| 2014/0377051 | A1* | 12/2014 | Sun | F04D 29/685 415/157 |
| 2015/0337863 | A1* | 11/2015 | Tomita | F04D 29/667 415/58.4 |
| 2019/0186502 | A1* | 6/2019 | Hu | F04D 29/4206 |
| 2020/0271045 | A1* | 8/2020 | Tomita | F04D 29/284 |
| 2023/0071034 | A1* | 3/2023 | Rusch | F04D 29/685 |

FOREIGN PATENT DOCUMENTS

| | | | |
|---|---|---|---|
| DE | 102008026744 A1 * | 1/2009 | ......... F04D 29/4213 |
| DE | 202014102773 U | 7/2014 | |
| DE | 102019216414 A1 | 8/2020 | |
| EP | 1316699 A2 | 6/2003 | |

OTHER PUBLICATIONS

Sumser et al (DE 19823274)—Machine Translation (Year: 1999).*
English Translation of International Search Report and Written Opinion in Application No. PCT/EP2021/063073, mailed Jul. 23, 2021, 2 pages.
European Search Report in European Application No. 20176373.7, dated Oct. 1, 2020, 7 pages.

* cited by examiner

STABILIZER OF A COMPRESSOR

TECHNICAL FIELD

The invention relates to the field of compressors, in particular radial compressors and diagonal compressors. In particular, the invention relates to a stabilizer at the compressor inlet for improving the map width and the characteristic curve slope of a compressor stage.

TECHNICAL BACKGROUND

Exhaust turbochargers are used to increase the power of internal combustion engines, in particular reciprocating piston engines. In this context, an exhaust gas turbocharger usually has a radial or diagonal compressor and a radial or axial turbine.

The mobile operating range of radial and diagonal compressors is limited toward smaller mass flows by the surge limit/flow instability: when the compressor is throttled, the incidence angles increasingly deteriorate until the flow separates and surge occurs. The permissible incidence angle range, at which the flow is still in contact, decreases with increasing flow Mach number. This means that the map width tends to decrease in the case of stages with a high pressure ratio and/or high absorption capacity.

As a characteristic curve stabilizing measure, a bypass in the form of an annular cavity within the compressor housing can be provided above the wheel contour of the compressor wheel, parallel to the intake duct. A bypass of this kind is also known as a stabilizer chamber or recirculator. By using a recirculator, the mass flow at the compressor wheel inlet can be artificially increased in the vicinity of the surge limit. Some of the mass flow is diverted from the compressor wheel into the side chamber (bypass). This mass flow has a strong swirl component (in the direction of rotation of the impeller—codirectional swirl). This codirectional swirl leads to a reduction in work conversion in the compressor, which leads to shallow characteristic curves in the vicinity of the surge limit.

In applications with pressure pulsations (e.g. due to the valve movement of the pressure-charged internal combustion engine), shallow characteristic curves in the vicinity of the surge limit can lead to unexpected surge. For this reason, there is a requirement to provide a minimum pressure increase between the operating point and the surge limit point on the operating speed characteristic. This requirement can scarcely be fulfilled in stages with a high pressure ratio and a conventional bypass/stabilizer channel—owing to the high work conversion and the shallow work coefficient curve over the mass flow at constant speed.

BRIEF DESCRIPTION OF THE INVENTION

It is the object of the present invention to provide a stabilizer of a compressor, in particular of a radial compressor or diagonal compressor, which is improved at least in respect of one of the disadvantages known from the prior art. Furthermore, it is the object of the present invention to provide an improved compressor and an improved turbomachine, in particular an improved turbocharger.

To achieve the abovementioned objects, a stabilizer of a compressor, in particular of a radial compressor or diagonal compressor, as claimed in independent claim 1 is provided. Furthermore, a compressor having a stabilizer according to the embodiments described herein and a turbomachine, in particular a turbocharger, having such a compressor are provided.

Further aspects, advantages and features of the present invention can be found in the dependent patent claims, the description and the accompanying figures.

According to one aspect of the invention, a stabilizer of a compressor, in particular of a radial compressor or diagonal compressor, is provided. The stabilizer comprises a first annular stabilizer chamber. The first annular stabilizer chamber surrounds a main flow channel in the intake region of a compressor wheel. Furthermore, the stabilizer comprises a second annular stabilizer chamber. The second annular stabilizer chamber surrounds the first annular stabilizer chamber.

Thus, a stabilizer is advantageously provided which makes it possible to improve the map width and the characteristic curve slope of a compressor stage. By means of the stabilizer described herein, having a first and a second annular stabilizer chamber, it is possible, in particular, for the distribution of the swirl and the axial velocity of the flow at the leading edge of the impeller, and thus the surge limit, to be influenced in a favorable way.

According to a second aspect of the invention, a compressor, in particular a radial compressor or a diagonal compressor, is provided which comprises a compressor wheel and a stabilizer according to one of the embodiments described herein. In particular, the compressor wheel comprises a number $N_1$ of compressor wheel blades in the region of the inlet opening of a first downstream inlet channel of the first annular stabilizer chamber, wherein a number $N_2$ of first flow guiding elements in the first downstream inlet channel is $N_2 \geq 1.5 \times N_1$. Alternatively or additionally, a number $N_3$ of second flow guiding elements in a second downstream inlet channel of the second annular stabilizer chamber can be $N_3 \geq 1.5 \times N_1$.

It is thus advantageously possible to provide a compressor having an improved characteristic map width and characteristic curve slope.

A third aspect of the invention relates to a turbomachine, in particular a turbocharger, having a compressor according to one of the embodiments described herein, and therefore a turbomachine, in particular a turbocharger, which is improved over the prior art is advantageously provided.

BRIEF DESCRIPTION OF THE FIGURES

The invention will be explained below with reference to exemplary embodiments, which are illustrated in the figures and from which further advantages and modifications can be derived. Here.

DETAILED DESCRIPTION OF THE FIGURES

There now follows a detailed description of the various embodiments, one or more examples of which are illustrated in each figure. Each example is for explanatory purposes and should not be interpreted as restrictive. For example, features illustrated or described as part of one embodiment may be used on or in conjunction with any other embodiment to obtain a further embodiment. The intention is that the present disclosure should include such modifications and variations.

In the following description of the drawings, the same reference numbers refer to the same or similar components. In general, only the differences with respect to the individual embodiments are described. Unless stated otherwise, the description of a part or aspect in one embodiment can also relate to a corresponding part or corresponding aspect in another embodiment.

Figure 1:
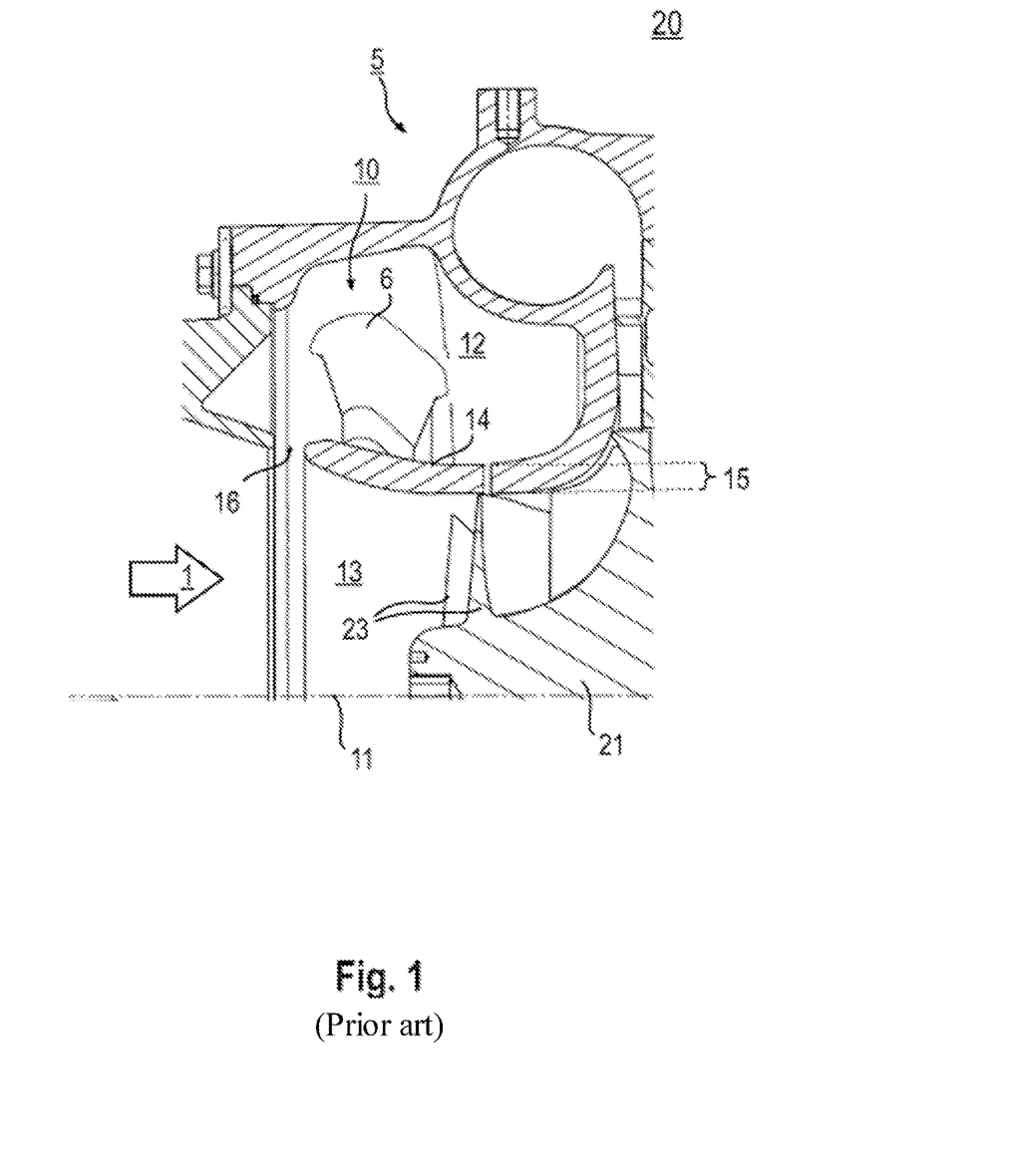
FIG. 1 shows a schematic view of a stabilizer of a compressor according to the prior art.

FIG. 1 shows a schematic view of a stabilizer 10 according to the prior art. In particular, FIG. 1 shows a section taken along the axis of rotation 11 of the compressor wheel 21 through a housing of a compressor 20, in particular of a radial compressor, of the kind used, for example, for compressing air in exhaust gas turbochargers. The compressor wheel 21 comprises compressor wheel blades 23. A stabilizer chamber 12 is arranged in the compressor housing 5. The stabilizer chamber 12 is connected to the main flow channel 13 via an inlet channel 15 and an outlet opening 16. The stabilizer chamber 12 is delimited with respect to the main flow channel 13 by means of an annular web 14. Arranged in the stabilizer chamber 12 are holding ribs 6, which connect the annular web 14 to the compressor housing.

Figure 2:
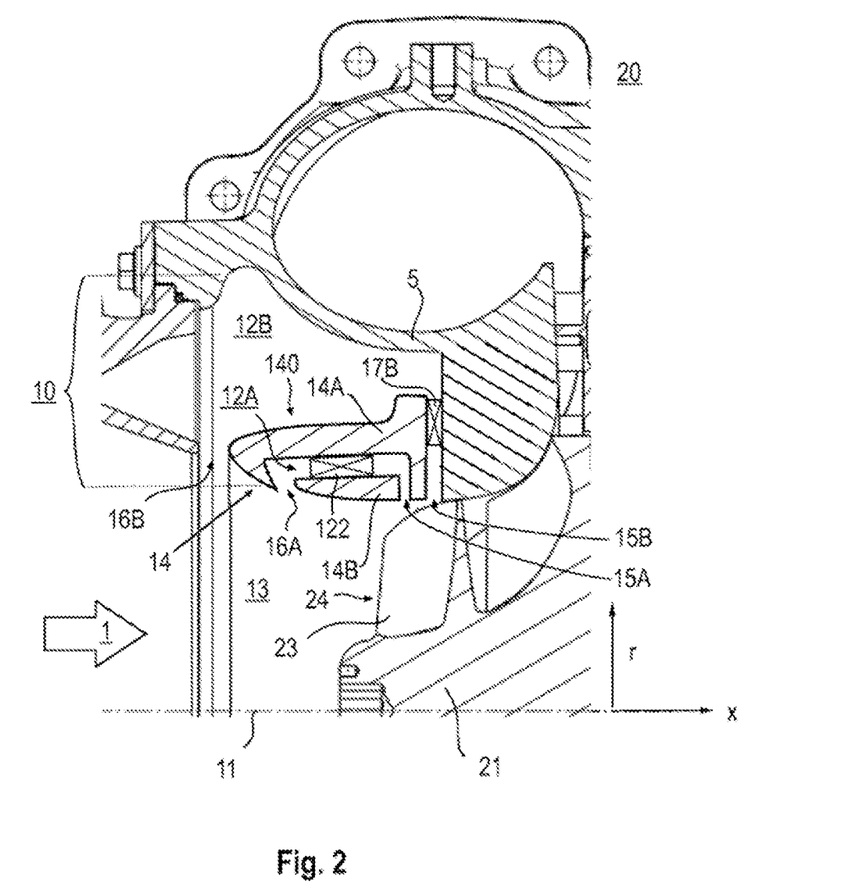
FIG. 2 shows a schematic view of a stabilizer of a compressor according to embodiments described herein.
Figure 3A:
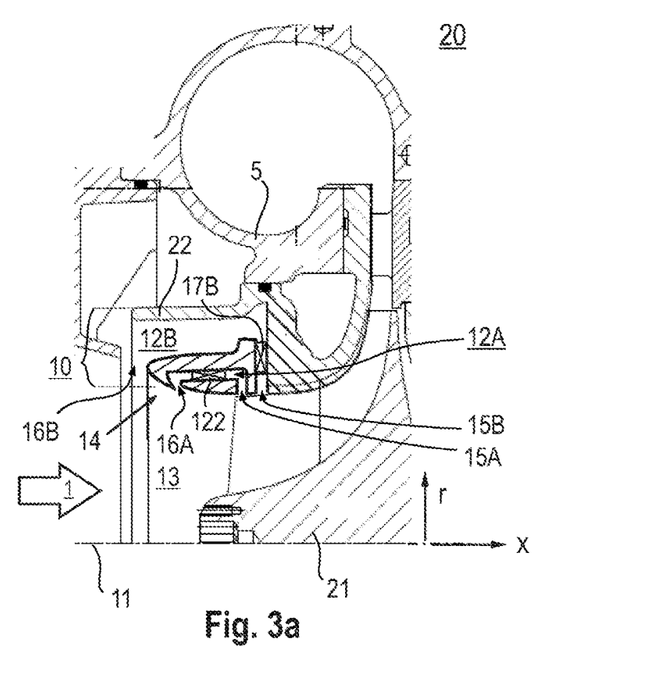
FIG. 3*a* shows a schematic view of a stabilizer according to a further embodiment described herein, in which a radially outer boundary of the second annular stabilizer chamber is formed by an insert.
Figure 3B:
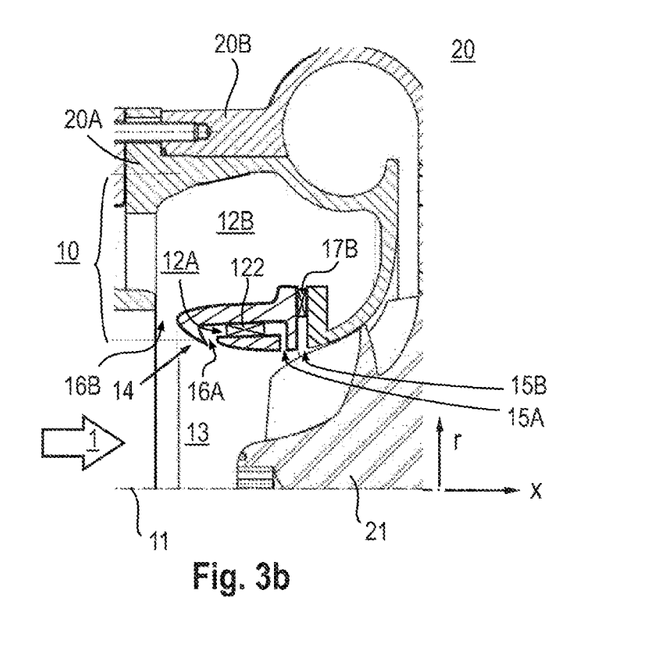
FIG. 3*b* shows a schematic view of a stabilizer according to a further embodiment described herein, in which a radially outer boundary of the second annular stabilizer chamber is formed by an inner compressor housing.

Embodiments of a stabilizer 10 of a compressor 20 according to the present disclosure are described with reference to FIGS. 2 to 7. The compressor can be a radial compressor or a diagonal compressor. As shown in FIG. 2, the stabilizer 10 is typically arranged at the compressor inlet.

According to one embodiment, which can be combined with other embodiments described herein, the stabilizer 10 comprises a first annular stabilizer chamber 12A, as illustrated by way of example in FIG. 2. The first annular stabilizer chamber 12A surrounds a main flow channel 13 in the intake region of a compressor wheel 21. Furthermore, the stabilizer 10 comprises a second annular stabilizer chamber 12B. The second annular stabilizer chamber 12B surrounds the first annular stabilizer chamber 12A. The first annular stabilizer chamber 12A and/or the second annular stabilizer chamber 12B can be of rotationally symmetrical design.

In this context, it should be noted that in the present disclosure, a "stabilizer chamber" should be understood, in particular, to mean a chamber in the compressor inlet region which is configured to improve a map width of a compressor stage. In particular, the first annular stabilizer chamber 12A and the second annular stabilizer chamber 12B can be designed as recirculation chambers.

According to one embodiment, which can be combined with other embodiments described herein, an annular separating element 140 is arranged between the first annular stabilizer chamber 12A and the second annular stabilizer chamber 12B. The separating element 140 at least partially delimits the first annular stabilizer chamber 12A with respect to the second annular stabilizer chamber 12B. "At least partial delimitation" should be understood to mean that the separating element 140 can have one or more connecting openings 143, by means of which the first annular stabilizer chamber 12A can be connected to the second annular stabilizer chamber 12B, as illustrated by way of example in FIG. 7.

According to one embodiment, which can be combined with other embodiments described herein, the annular separating element 140 is formed by a first annular web 14A, as illustrated by way of example in FIG. 2. Alternatively, the annular separating element 140 can be formed by a separating plate 141, as illustrated by way of example in FIG. 5.

In this context, it should be noted that the annular separating element 140 is designed to provide a boundary between the first annular stabilizer chamber 12A and the second annular stabilizer chamber 12B, thus enabling a flow in the first annular stabilizer chamber 12A to be substantially separated from a flow in the second annular stabilizer chamber 12B. In other words, it is advantageously possible, by means of the annular separating element 140 described herein, to provide two different flows, namely a first flow in the first annular stabilizer chamber 12A and a second flow in the second annular stabilizer chamber 12B.

Figure 6:
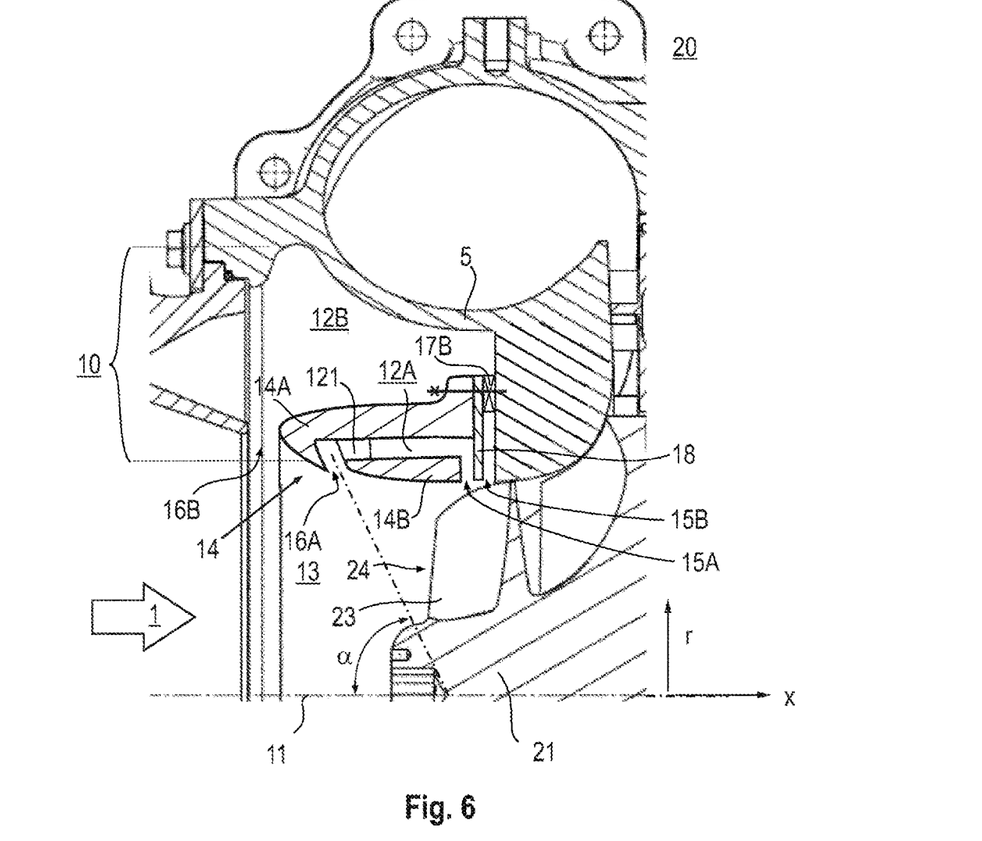
Figure 7:
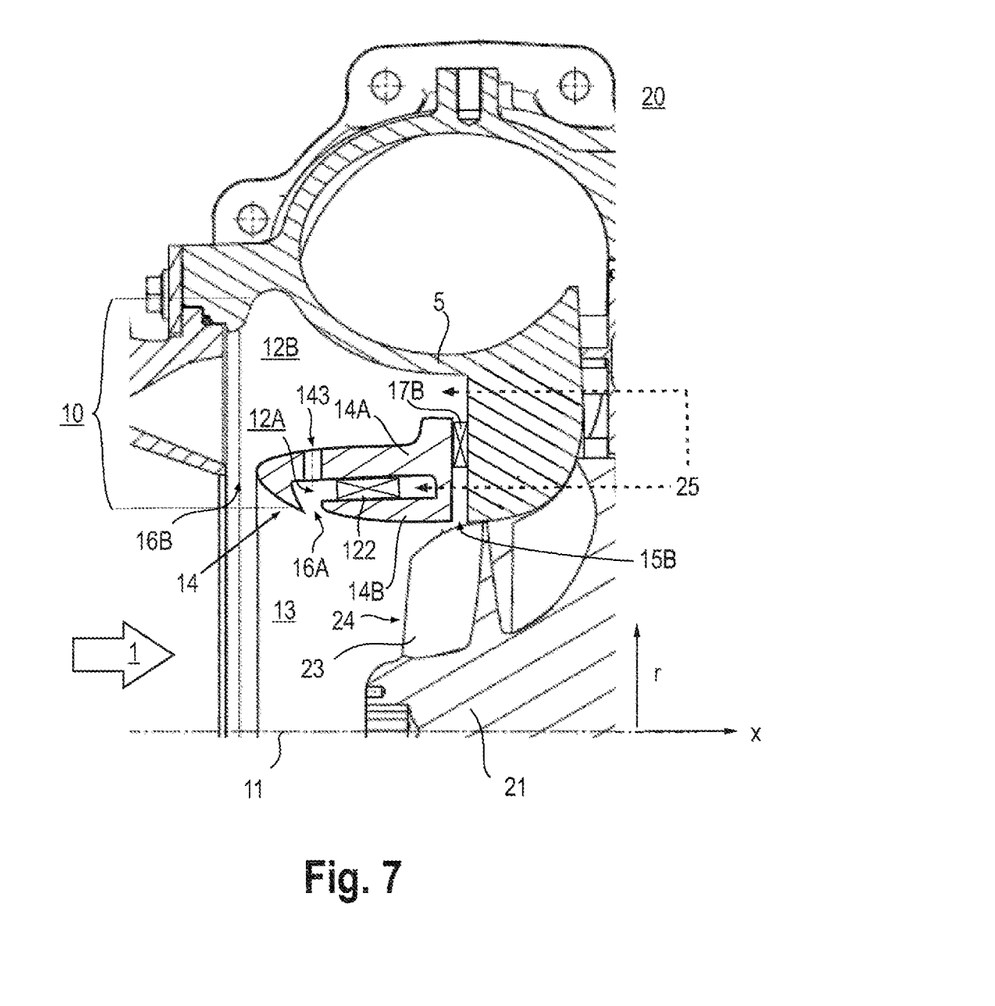

According to one embodiment, which can be combined with other embodiments described herein, one or more struts 121 are arranged in the first annular stabilizer chamber 12A, as illustrated by way of example in FIG. 6. The struts can be produced by drilling, milling or casting.

Alternatively or additionally, one or more blades 122 can be arranged in the first annular stabilizer chamber 12A, as illustrated by way of example in FIGS. 2, 3a, 3b and 7.

According to one embodiment, which can be combined with other embodiments described herein, the second annular stabilizer chamber 12B is free from blades. In particular, the second annular stabilizer chamber 12B can be free from blades and free from struts. In other words, there are optionally no blades, in particular no flow guide vanes, and/or no struts arranged in the second annular stabilizer chamber 12B.

According to one embodiment, which can be combined with other embodiments described herein, the first annular stabilizer chamber 12A communicates with the main flow channel 13 via a first downstream inlet channel 15A and a first upstream outlet opening 16A, as illustrated by way of example in FIGS. 2, 3a, 3b, 5 and 6. In this context, attention is drawn to the fact that the first downstream inlet channel 15A can also be an inlet channel for the second annular stabilizer chamber 12B or can open into the second downstream inlet channel 15B, as illustrated by way of example in FIG. 4.

In the present disclosure, the term "inlet channel" should be understood to mean a channel which serves as a flow inlet channel into a stabilizer chamber described herein.

In the present disclosure, the terms "downstream" and "upstream" refer to the main flow in the main flow channel in the intake region of a compressor wheel. For better understanding, the main flow direction 1 has been entered on the figures.

According to one example, the first inlet channel 15A of the first stabilizer chamber 12A can be arranged downstream of an inlet edge 24 of the compressor wheel 21, as shown in FIG. 2. The first outlet opening 16A of the first stabilizer chamber 12A is typically arranged upstream of the inlet edge 24 of the compressor wheel 21.

In a similar manner, the second inlet channel 15B of the second stabilizer chamber 12B is typically arranged downstream of the inlet edge 24 of the compressor wheel 21. In particular, the second inlet channel 15B can be arranged downstream of the first inlet channel 15A. The second outlet opening 16B of the second stabilizer chamber 12B is typically arranged upstream of the inlet edge 24 of the compressor wheel 21. In particular, the second outlet opening 16B of the second stabilizer chamber 12B can be upstream of the first outlet opening 16A of the first stabilizer chamber 12A.

Figure 5:
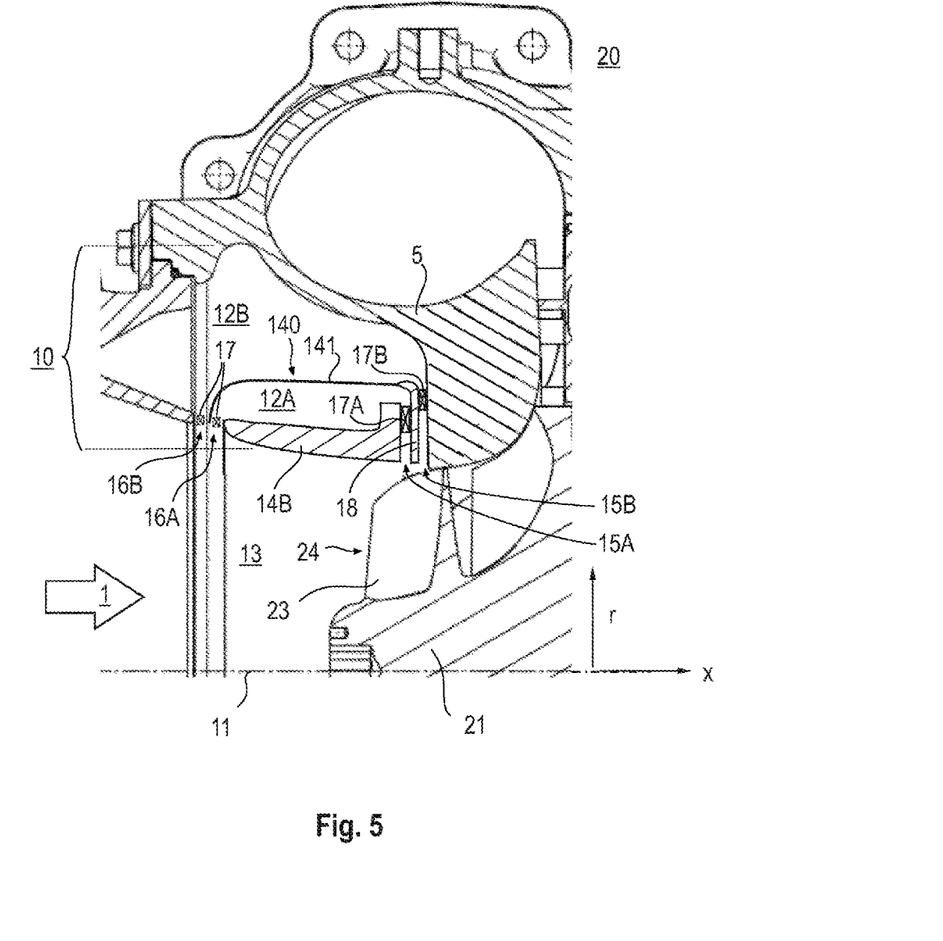

According to one embodiment, which can be combined with other embodiments described herein, at least one flow guiding element 17 is arranged in the first outlet opening 16A and/or in the second outlet opening 16B, as indicated schematically in FIG. 5 by the dashed elements. The at least one flow guiding element 17 in the first outlet opening 16A and/or in the second outlet opening 16B can be configured in a manner analogous to the at least one first flow guiding element 17A and/or in a manner analogous to the at least one second flow guiding element 17B, as described herein.

According to one embodiment, which can be combined with other embodiments described herein, the first downstream inlet channel 15A and/or the second downstream inlet channel 15B extend/extends substantially in the radial direction, as illustrated by way of example in FIG. 2.

In the present disclosure, the term "substantially radially" should be understood to mean an angular range of ±45° or less, in particular of ±25° or less, relative to the radial direction r. As illustrated by way of example in FIG. 2, the radial direction r extends perpendicularly to the central axis 11. According to one example, "substantially radially" should be understood to mean an angular range of ±10° or less relative to the radial direction r.

According to one embodiment, which can be combined with other embodiments described herein, the first upstream outlet opening 16A is inclined with respect to the axial direction x of the main flow channel 13 by an angle α, as illustrated by way of example in FIG. 6. Typically, the angle α is selected from a range of $20° \leq \alpha \leq 90°$.

According to one embodiment, which can be combined with other embodiments described herein, at least one first flow guiding element 17A is arranged in the first downstream inlet channel 15A, as illustrated by way of example in FIG. 5. In other words, one or more first flow guiding elements 17A can be arranged in the first downstream inlet channel 15A. In the case where a plurality of first flow guiding elements 17A is arranged in the first downstream inlet channel 15A, the plurality of first flow guiding elements 17A can be arranged circumferentially, in particular concentrically, around the central axis 11 of the main flow channel 13 or around the axis of rotation of the compressor wheel.

According to one embodiment, which can be combined with other embodiments described herein, the at least one or the plurality of first flow guiding elements 17A has a centering seat, which is designed for arrangement of the one or the plurality of first flow guiding elements 17A, in particular concentrically, around the central axis 11 of the main flow channel 13 in the first downstream inlet channel 15A.

According to one embodiment, which can be combined with other embodiments described herein, the at least one or the plurality of flow guiding elements 17B has a centering seat, which is designed for arrangement of the one or the plurality of second flow guiding elements 17B, in particular concentrically, around the central axis 11 of the main flow channel 13 in the second downstream inlet channel 15B.

The centering seat can be implemented, for example, by means of one or more centering elements, one or more centering pins, or a centering edge on the components to be centered.

In this context, it should be pointed out that one or more centering shoulders, for example conical or cylindrical, can be provided on the annular element 14 and/or on the annular plate 18 and/or on the compressor housing 5 and/or on the insert 22 and/or on the inner compressor housing 20A in order to center the respective components which are connected to one another.

According to one embodiment, which can be combined with other embodiments described herein, the second annular stabilizer chamber 12B communicates with the main flow channel 13 via a second downstream inlet channel 15B and a second upstream outlet opening 16B, as illustrated by way of example in FIGS. 2, 3a, 3b, 4, 5, 6 and 7.

According to one embodiment, which can be combined with other embodiments described herein, at least one second flow guiding element 17B is arranged in the second downstream inlet channel 15B, as illustrated by way of example in FIGS. 2, 3a, 3b, 4, 5, 6 and 7. In other words, one or more second flow guiding elements 17B can be arranged in the second downstream inlet channel 15B. In the case where a plurality of second flow guiding elements 17B is arranged in the second downstream inlet channel 15B, the plurality of second flow guiding elements 17B can be arranged circumferentially, in particular concentrically, around the central axis 11 of the main flow channel 13 or around the axis of rotation of the compressor wheel.

According to one embodiment, which can be combined with other embodiments described herein, the at least one first flow guiding element 17A and/or the at least one second flow guiding element 17B are/is designed and arranged in order to provide a deflecting grid through which flow can occur. For example, the deflecting grid can be designed and arranged in such a way as to provide a deflecting grid through which flow can occur substantially radially.

The at least one first flow guiding element 17A and/or the at least one second flow guiding element 17B can be in the form of a spiral, for example. Typically, the at least one first flow guiding element 17A and/or the at least one second flow guiding element 17B comprise/comprises a plurality of flow guiding elements, which are arranged circumferentially around a central axis 11 of the main flow channel 13. In particular, the plurality of first flow guiding elements 17A and/or the plurality of second flow guiding elements 17B can be arranged concentrically around the central axis 11 of the main flow channel 13.

According to one embodiment, which can be combined with other embodiments described herein, the first downstream inlet channel 15A and the second downstream inlet channel 15B are separated from one another by means of a substantially radially extending annular plate 18, as illustrated by way of example in FIG. 6. The at least one second flow guiding element 17B can be formed integrally (in one piece) with the annular plate 18. Alternatively or additionally, the at least one first flow guiding element 17A can be formed integrally (in one piece) with the annular plate 18.

According to one embodiment, which can be combined with other embodiments described herein, the second annular stabilizer chamber 12B has a radially outer boundary which is formed by a part of a compressor housing 5, as illustrated by way of example in FIG. 2. Alternatively, the radially outer boundary of the second annular stabilizer chamber 12B can be formed by an insert 22, which is inserted into the compressor housing 5, as shown by way of example in FIG. 3a. According to a further alternative, the radially outer boundary of the second annular stabilizer chamber 12B can be formed by an inner compressor housing 20A, as illustrated by way of example in FIG. 3b.

According to one embodiment, which can be combined with other embodiments described herein, the first annular stabilizer chamber 12A has a radially inner boundary. The radially inner boundary is typically formed by a second annular web 14B, as illustrated by way of example in FIGS. 2, 5 and 6 and 7. The second annular web 14B delimits the first annular stabilizer chamber 12A with respect to the main flow channel 13.

Figure 4:
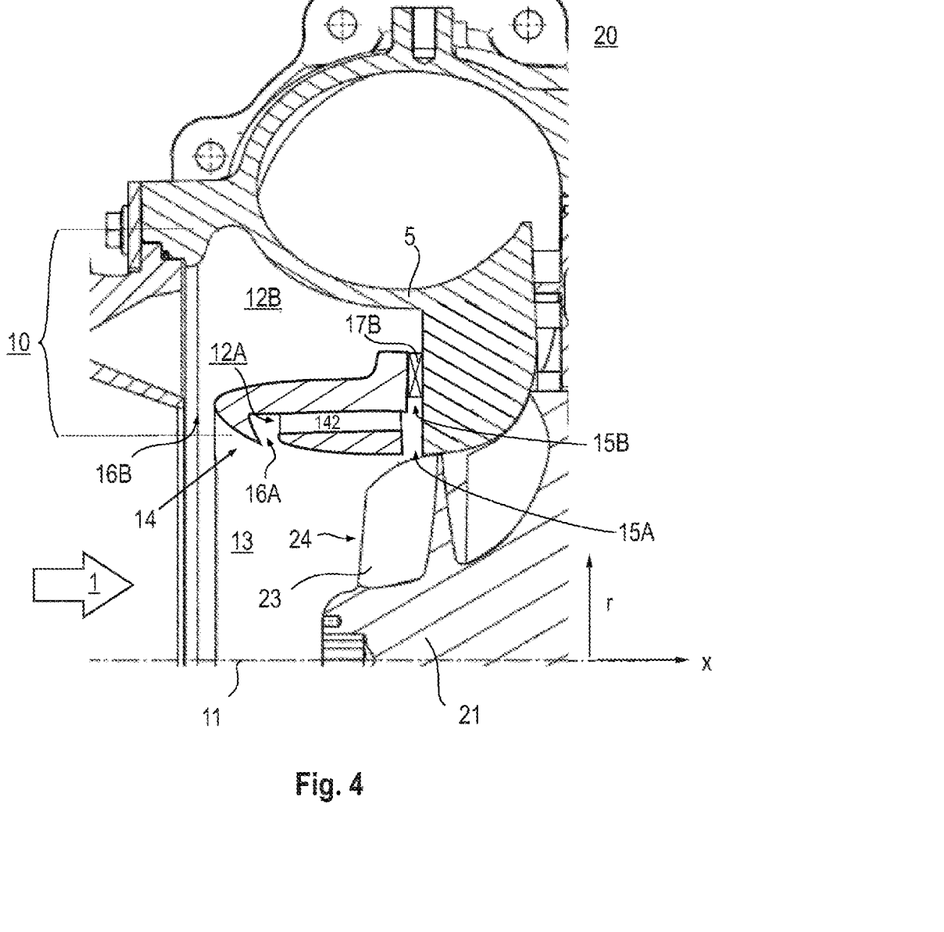
FIGS. 4 to 7 show schematic views of a stabilizer according to further embodiments described herein.

According to one embodiment, which can be combined with other embodiments described herein, the first annular stabilizer chamber 12A is provided by an annular groove 142, which is arranged in an annular element 14 which surrounds the main flow channel 13, as illustrated by way of example in FIG. 4. The annular element 14 can be embodied as a turned/milled component or a turned/bored component.

According to one embodiment, which can be combined with other embodiments described herein, the first annular web 14A and/or the annular plate 18 are/is connected to the compressor housing 5 via at least one flow guiding element, in particular via at least one second flow guiding element 17B in the second inlet channel 15B, for example by means of a screwed joint, as illustrated by way of example in FIG. 6. The screwed joint can extend through the at least one flow guiding element. It should be noted that the screwed joints can also be embodied in some other way, i.e. in such a way that they do not extend through the at least one flow guiding element. Alternatively or additionally, it is also possible to use other types of connection, such as pinning, shrinking or clamping.

Alternatively, the first annular web 14A and/or the annular plate 18 can be connected to the inner compressor housing 20A or the insert 22 via at least one flow guiding element, in particular via at least one second flow guiding element 17B in the second inlet channel 15B.

According to one embodiment, which can be combined with other embodiments described herein, the stabilizer 10 furthermore comprises an external gas supply 25. For example, the gas supply 25 can be connected to the first annular stabilizer chamber 12A and/or to the second annular stabilizer chamber 12B, as illustrated schematically in FIG. 7. The gas supply can be a barrier air supply or a premix gas supply, for example.

According to a second aspect of the present disclosure, a compressor 20, in particular a radial compressor or a diagonal compressor, is provided which comprises a compressor wheel 21 and a stabilizer 10 according to one of the embodiments described herein. According to one embodiment, which can be combined with other embodiments described herein, the compressor wheel 21 comprises a number $N_1$ of compressor wheel blades 23 in the region of the inlet opening of the first downstream inlet channel 15A. A number $N_2$ of first flow guiding elements 17A in the first downstream inlet channel 15A is $N_2 \geq 1.5 \times N_1$. Alternatively or additionally, a number $N_3$ of second flow guiding elements 17B in a second downstream inlet channel 15B can be $N_3 \geq 1.5 \times N_1$. Such a choice of the number $N_2$ and/or number $N_3$ is advantageous in order to reduce the development of noise and vibration during operation of the compressor.

A third aspect of the invention relates to a turbomachine, in particular a turbocharger, having a compressor according to one of the embodiments described herein, and therefore a turbomachine, in particular a turbocharger, which is improved over the prior art is advantageously provided.

LIST OF REFERENCE SIGNS 1 main flow direction
5 compressor housing
6 strut in the stabilizer according to the prior art
10 stabilizer
11 central axis/axis of rotation of the compressor wheel
12 annular stabilizer chamber according to the prior art
12A first annular stabilizer chamber
12B second annular stabilizer chamber
121 plurality of struts of the first annular stabilizer chamber
122 plurality of blades of the first annular stabilizer chamber
13 main flow channel
14 annular web/annular element
14A first annular web
14B second annular web
140 ring-shaped separating element
141 separating plate
142 annular groove
143 connecting opening in the annular separating element between the first and second annular stabilizer chamber,
15 inlet channel according to the prior art
15A first inlet channel of the first stabilizer chamber
15B second inlet channel of the second stabilizer chamber
16 outlet opening according to the prior art
16A first outlet opening of the first stabilizer chamber
16B second outlet opening of the second stabilizer chamber
17 at least one flow guiding element in the first outlet opening 16A and/or
in the second outlet opening 16B
17A at least one first flow guiding element in the first inlet channel
17B at least one second flow guiding element in the second inlet channel
18 annular plate extending substantially in the radial direction
20 compressor
20A compressor inner housing
20B compressor outer housing
21 compressor wheel
22 insert
23 compressor wheel blades
24 inlet edge of the compressor wheel
25 external barrier air supply
r radial direction
x axial direction
α angle of inclination of the first upstream outlet opening 16A relative to the axial direction x of the main flow channel

The invention claimed is:

1. A stabilizer of a compressor, comprising:
a first annular stabilizer chamber, wherein the first annular stabilizer chamber surrounds a main flow channel in an intake region of a compressor wheel, said compressor having a direction of flow from the intake region toward the compressor wheel,
a second annular stabilizer chamber, wherein the second annular stabilizer chamber surrounds the first annular stabilizer chamber,
an annular separating element arranged between the first annular stabilizer chamber and the second annular stabilizer chamber,
a first downstream inlet channel defined at least in part by the annular separating element, wherein the first annular stabilizer channel communicates with the main flow channel via the first downstream inlet channel extending parallel to a radial direction, and wherein the first downstream inlet channel is not defined in any part by a housing of the compressor, and a second downstream inlet channel defined at least in part by the annular separating element and the housing of the compressor, wherein the second downstream inlet channel is separate from the first downstream inlet channel, and wherein the second annular stabilizer channel communicates with the main flow channel via the second downstream inlet channel extending parallel to the radial direction, wherein at least one of the following applies: at least one first flow guiding element is arranged in the first downstream inlet channel, wherein the first annular stabilizer chamber extends along the direction of flow transversally to the radial direction, and at least one second flow guiding element is arranged in the second downstream inlet channel, wherein the second annular stabilizer chamber extends along the direction of flow transversally to the radial direction.

2. The stabilizer as claimed in claim 1, wherein the annular separating element at least partially delimits the first annular stabilizer chamber with respect to the second annular stabilizer chamber.

3. The stabilizer as claimed in claim 1, wherein one or more blades are arranged in the first annular stabilizer chamber.

4. The stabilizer as claimed in claim 1, wherein the at least one second flow guiding element is arranged in the second downstream inlet channel and a remaining portion of the second annular stabilizer chamber is free from blades and struts.

5. The stabilizer as claimed in claim 1, wherein the first annular stabilizer chamber furthermore communicates with the main flow channel via a first upstream outlet opening.

6. The stabilizer as claimed in claim 5, wherein the first upstream outlet opening is inclined with respect to the axial direction x of the main flow channel by an angle α, wherein the angle is $20° \leq \alpha \leq 90°$.

7. The stabilizer as claimed in claim 1, wherein the second annular stabilizer chamber furthermore communicates with the main flow channel via a second upstream outlet opening.

8. The stabilizer as claimed in claim 1, wherein the annular separating element is formed by one element selected from a first annular web and a separating plate.

9. The stabilizer as claimed in claim 1, wherein the second annular stabilizer chamber has a radially outer boundary which is formed by one element selected from a part of the compressor housing, an insert, and an inner compressor housing.

10. The stabilizer as claimed in claim 1, wherein the first annular stabilizer chamber has a radially inner boundary which is formed by a second annular web, wherein the second annular web at least partially delimits the first annular stabilizer chamber with respect to the main flow channel.

11. A compressor having a compressor wheel and a stabilizer, the stabilizer comprising:
a first annular stabilizer chamber, wherein the first annular stabilizer chamber surrounds a main flow channel in an intake region of a compressor wheel, said compressor having a direction of flow from the intake region toward the compressor wheel,
a second annular stabilizer chamber, wherein the second annular stabilizer chamber surrounds the first annular stabilizer chamber,
an annular separating element arranged between the first annular stabilizer chamber and the second annular stabilizer chamber,
a first downstream inlet channel defined at least in part by the annular separating element, wherein the first annular stabilizer channel communicates with the main flow channel via the first downstream inlet channel extending parallel to a radial direction, and wherein the first downstream inlet channel is not defined in any part by a housing of the compressor, and
a second downstream inlet channel defined at least in part by the annular separating element and the housing of the compressor, wherein the second downstream inlet channel is separate from the first downstream inlet channel, and wherein the second annular stabilizer channel communicates with the main flow channel via the second downstream inlet channel extending parallel to the radial direction,
wherein at least one of the following applies: at least one first flow guiding element is arranged in the first downstream inlet channel, wherein the first annular stabilizer chamber extends along the direction of flow transversally to the radial direction, and at least one second flow guiding element is arranged in the second downstream inlet channel, wherein the second annular stabilizer chamber extends along the direction of flow transversally to the radial direction.

12. A turbomachine having a compressor having a compressor wheel and a stabilizer, the stabilizer comprising:
a first annular stabilizer chamber, wherein the first annular stabilizer chamber surrounds a main flow channel in an intake region of a compressor wheel, said compressor having a direction of flow from the intake region toward the compressor wheel,
a second annular stabilizer chamber, wherein the second annular stabilizer channel surrounds the first annular stabilizer chamber,
an annular separating element arranged between the first annular stabilizer chamber and the second annular stabilizer chamber,
a first downstream inlet channel defined at least in part by the annular separating element, wherein the first annular stabilizer channel communicates with the main flow channel via the first downstream inlet channel extending parallel to a radial direction, and wherein the first downstream inlet channel is not defined in any part by a housing of the compressor, and
a second downstream inlet channel defined at least in part by the annular separating element and the housing of the compressor, wherein the second downstream inlet channel is separate from the first downstream inlet channel, and wherein the second annular stabilizer channel communicates with the main flow channel via the second downstream inlet channel extending parallel to the radial direction,
wherein at least one of the following applies: at least one first flow guiding element is arranged in the first downstream inlet channel, wherein the first annular stabilizer chamber extends along the direction of flow transversally to the radial direction, and at least one second flow guiding element is arranged in the second downstream inlet channel, wherein the second annular stabilizer chamber extends along the direction of flow transversally to the radial direction.

13. The stabilizer as claimed in claim 1, wherein the first downstream inlet channel and the second downstream inlet channel each communicate separately with the main flow channel.

14. The stabilizer as claimed in claim 1, wherein the at least one second flow guiding element is formed integrally with a radially extending annular plate separating the first downstream inlet channel and the second downstream inlet channel from one another.

15. The stabilizer as claimed in claim 14, wherein the radially extending annular plate is arranged within an angular range of ±10° or less relative to the radial direction r.

* * * * *